(12) United States Patent
Makiguchi et al.

(10) Patent No.: US 11,843,763 B2
(45) Date of Patent: Dec. 12, 2023

(54) DISPLAY DEVICE AND METHOD (71) Applicant: Nippon Telegraph and Telephone Corporation, Tokyo (JP)

(72) Inventors: Motohiro Makiguchi, Musashino (JP); Hideaki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 92 days.

(21) Appl. No.: 17/603,196

(22) PCT Filed: May 14, 2019

(86) PCT No.: PCT/JP2019/019047
§ 371 (c)(1),
(2) Date: Oct. 12, 2021

(87) PCT Pub. No.: WO2020/230258
PCT Pub. Date: Nov. 19, 2020

(65) Prior Publication Data
US 2022/0191464 A1 Jun. 16, 2022

(51) Int. Cl.
*H04N 13/363* (2018.01)
*H04N 13/366* (2018.01)
*G02B 27/00* (2006.01)

(52) U.S. Cl.
CPC ....... *H04N 13/363* (2018.05); *G02B 27/0093* (2013.01); *H04N 13/366* (2018.05)

(58) Field of Classification Search
CPC ...... H04N 13/363; H04N 13/366; H04N 5/74; H04N 13/376; G02B 27/0093; G02B 30/40
(Continued)

(56) References Cited

U.S. PATENT DOCUMENTS 5,936,774 A * 8/1999 Street ................... H04N 13/31
348/E13.052
6,483,643 B1 * 11/2002 Zuchowski ............ G03B 21/56
359/452
(Continued)

FOREIGN PATENT DOCUMENTS

JP H0624511 A 2/1994
JP 2016116162 6/2016

OTHER PUBLICATIONS

Makiguchi et al., "Smooth Motion Parallax Glassless 3D Screen System Using Linear Blending of Viewing Zones and Spatially Imaged Iris Plane," SID Digest, 2017, 48(1):903-906.

*Primary Examiner* — Tung T Vo
(74) *Attorney, Agent, or Firm* — Fish & Richardson P.C.

(57) ABSTRACT

Provided is a display method that prevents degradation of image quality due to ghosting. The display method performed with a display apparatus includes a viewpoint position detection step (S1) for detecting a viewpoint position d that is an interval between a reflection screen and a viewer α, a diffusion property control step (S2) for controlling a diffusion property of the reflection screen 40 in accordance with the viewpoint position d, and a projection step for projecting multiple viewpoint video images having disparity from multiple projectors to the reflection screen. The diffusion property control step (S2) includes controlling the diffusion property of the reflection screen 40 by varying a voltage or a duty cycle of an ac signal that is applied to a diffuser layer included in the reflection screen.

6 Claims, 6 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 6,710,920 | B1* | 3/2004 | Mashitani | H04N 13/32 |
| | | | | 359/464 |
| 7,057,813 | B2* | 6/2006 | Umeya | G03B 21/625 |
| | | | | 359/465 |
| 9,182,524 | B2* | 11/2015 | Smithwick | G03B 21/60 |
| 9,891,517 | B2* | 2/2018 | Yamashita | H04N 9/3141 |
| 2003/0025955 | A1* | 2/2003 | Curtis | G11B 7/0065 |
| 2006/0109548 | A1* | 5/2006 | Goto | G03B 21/602 |
| | | | | 359/449 |
| 2006/0256302 | A1* | 11/2006 | Hsu | H04N 13/302 |
| | | | | 348/E13.043 |
| 2013/0342814 | A1* | 12/2013 | Atkins | G03B 35/24 |
| | | | | 353/38 |
| 2014/0022222 | A1* | 1/2014 | Kuo | G02B 26/08 |
| | | | | 345/205 |
| 2016/0360167 | A1* | 12/2016 | Mitchell | H04N 9/3182 |
| 2017/0324944 | A1* | 11/2017 | Nakajima | H04N 13/363 |
| 2022/0155614 | A1* | 5/2022 | Kikuta | G02B 30/56 |
| 2022/0264076 | A1* | 8/2022 | Makinen | G02B 30/26 |
| 2022/0385885 | A1* | 12/2022 | Mitani | G03B 21/56 |

* cited by examiner

DISPLAY DEVICE AND METHOD

CROSS-REFERENCE TO RELATED APPLICATIONS

This application is a National Stage application under 35 U.S.C. § 371 of International Application No. PCT/JP2019/019047, having an International Filing Date of May 14, 2019. The disclosure of the prior application is considered part of the disclosure of this application, and is incorporated in its entirety into this application.

TECHNICAL FIELD

The present invention relates to a display apparatus and a method therefor.

BACKGROUND ART

Technologies have been proposed for enabling a 3D video image with motion parallax effect to be viewed with a naked eye by projecting, with multiple projectors, multiple viewpoint video images having disparity in a horizontal direction, and controlling a diffusion property and a focusing property of a screen to allow a viewer to visually recognize a video image in accordance with a viewpoint position (position of both eyes) of the viewer. Motion parallax is parallax resulting from a movement of the viewpoint of the viewer.

For example, NPL 1 discloses a method for projecting a 3D video image with fewer projectors (sparsely spaced projectors) than conventional methods by using a mechanism of vision called linear blending. Linear blending refers to smoothly varying a ratio of optical luminance between video images that overlap each other with a movement of the viewpoint to adjacent regions of view.

CITATION LIST

Non Patent Literature

[NPL 1] M. Makiguchi et al. "Smooth Motion Parallax Glassless 3D Screen System. Using Linear Blending of Viewing Zones and Spatially Imaged Iris Plane," SID, Vol. 48, Issue 1, 99.903-906

SUMMARY OF THE INVENTION

Technical Problem

The method in NPL 1 has a problem of causing degradation of image quality due to ghosting when an ideal distribution of luminance, where the ratio of luminance as combined on the screen is constant and a video image from a projector alone is visually recognized in front of this projector, is not met. For example, if a diffusion angle of the screen is too wide with respect to a disposition interval between the projectors, then video images of the projectors are also perceived at a viewpoint other than an intermediate viewpoint, thus causing ghosting to be seen.

The present invention is made with this problem in view, and an object thereof is to provide display apparatus and method that prevent degradation of image quality due to ghosting by appropriately controlling the diffusion angle of the screen with respect to the disposition interval between the projectors according to the viewpoint position of the viewer.

Means for Solving the Problem

A display method according to one aspect of the present embodiment is a display method performed with a display apparatus. The display method has the feature of including a viewpoint position detection step for detecting a viewpoint position that is an interval between a reflection screen and a viewer, a diffusion property control step for controlling a diffusion property of the reflection screen in accordance with the viewpoint position; and a projection step for projecting multiple viewpoint video images having disparity from multiple projectors to the reflection screen.

A display apparatus according to one aspect of the present embodiment is a display apparatus that projects multiple viewpoint video images having disparity from multiple projectors to display a three-dimensional image. The display apparatus has the feature of including a viewpoint detection unit that detects a viewpoint position where a viewer visually recognizes the three-dimensional image; a reflection screen of which a diffusion property is controlled, and a diffusion property control unit that controls the diffusion property in accordance with the viewpoint position.

Effects of the Invention

The present invention provides display apparatus and method that prevents degradation of image quality due to ghosting.

DESCRIPTION OF EMBODIMENTS

The following explains an embodiment of the present invention, using the drawings.

(Configuration of a Display Apparatus)

Figure 1:
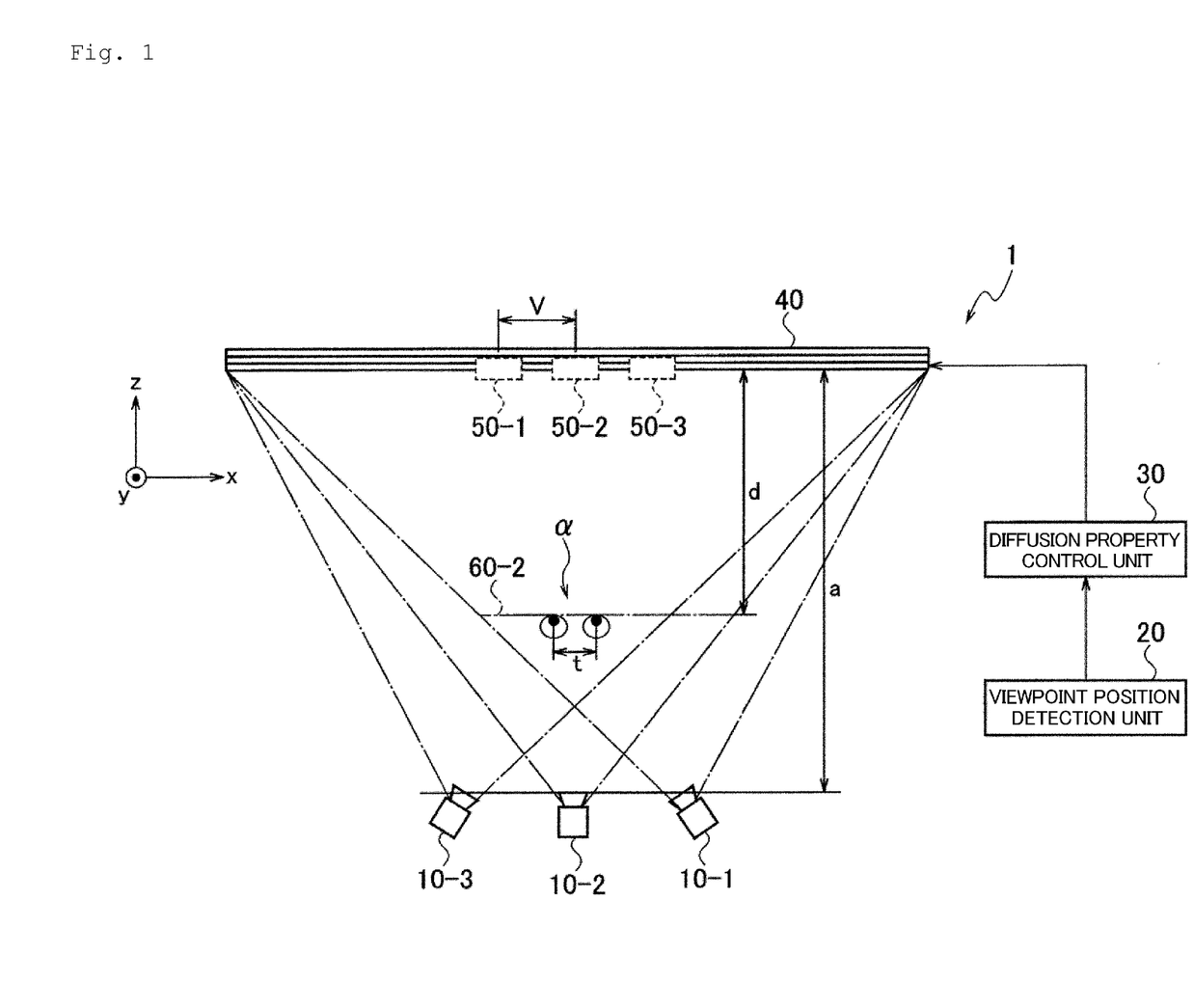
FIG. 1 illustrates an example of the functional configuration of a display apparatus according to an embodiment of the present invention.

FIG. 1 illustrates an example of the functional configuration of a display apparatus according to the embodiment. A display apparatus 1 illustrated in FIG. 1 is a display apparatus that projects multiple viewpoint video images having disparity from multiple projectors to display a three-dimensional image. Viewpoint video images having disparity refer to video images of an object as captured from different directions (viewpoints).

The display apparatus 1 is provided with multiple projectors 10-1, 10-2, and 10-3, a viewpoint position detection unit 20, a diffusion property control unit 30, and a reflection screen 40. In FIG. 1, the lateral direction of the reflection screen 40 as seen from a viewer α that visually recognizes the three-dimensional image is defined as x direction, the vertical direction as y direction, and the thickness direction (depth direction) as z direction. The side of the viewer α is called front side.

FIG. 1 indicates an example of providing three projectors 10-1, 10-2, 10-3. Meanwhile, it is only necessary to provide two or more projectors. In the explanation hereafter, these projectors are denoted as "projectors 10" when it is not necessary to specify the positions of the projectors. The same applies to other reference signs.

The viewpoint position detection unit 20 detects a viewpoint position d where the viewer α visually recognizes the three-dimensional image. The viewpoint position d refers to an interval (in the z direction) between the reflection screen 40 and the viewer α. As indicated in FIG. 1, the viewpoint position (interval d) is not changed even if the viewer α moves in the x direction.

The viewpoint position d may be detected by using, for example, a camera to capture an image from the x direction or the z direction. Alternatively, the viewpoint position d may be fixed at a prescribed position. The interval d is hereafter called the viewpoint position d.

Meanwhile, although FIG. 1 illustrates an example in which the viewer α is positioned between the projectors 10 and the reflection screen 40, this positional relation is not limited to this example. The viewer α may see the reflection screen 40 at a position away from the projectors 10 in the −z direction.

The diffusion property control unit 30 controls a diffusion property of the reflection screen 40 in accordance with the viewpoint position d. In the case where the viewpoint position d is detected with, for example, a camera, diffusion property control unit 30 controls the diffusion property of the reflection screen 40 in accordance with the viewpoint position d as detected. Alternatively, in the case where the viewpoint position d is fixed in advance, diffusion property control unit 30 sets the diffusion property of the reflection screen 40 a diffusion property according to the viewpoint position d as fixed.

(Display Method)

Figure 2:
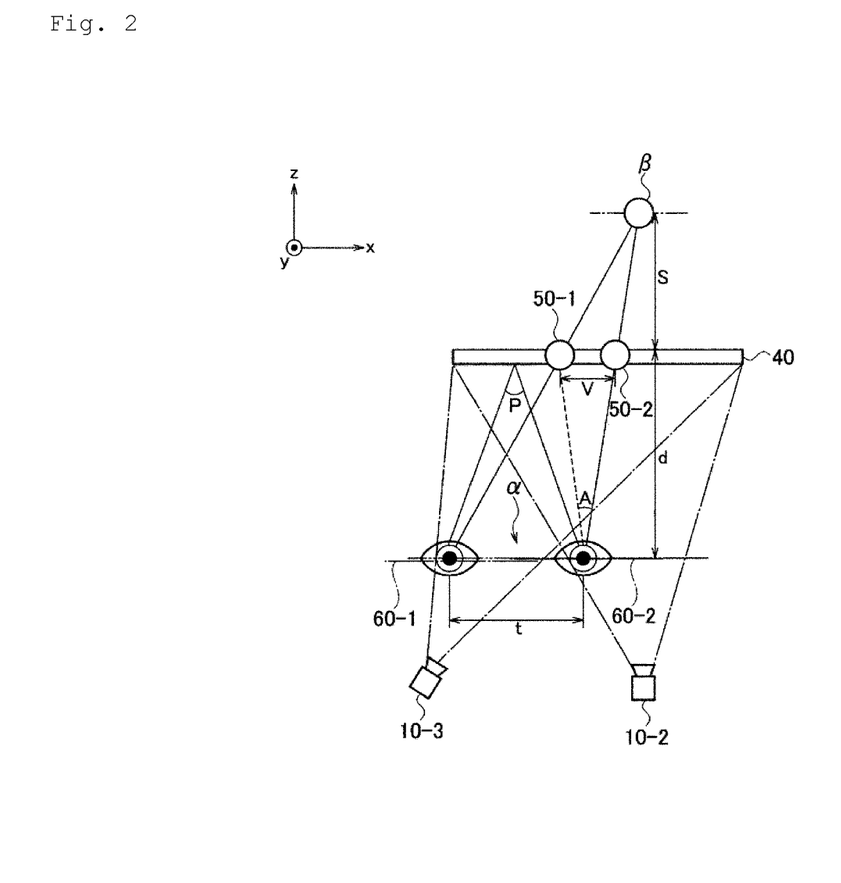
FIG. 2 is a schematic view that explains the principle of a display method performed with the display apparatus illustrated in FIG. 1.

FIG. 2 illustrates a part of FIG. 1, and is a schematic view that explains the principle of a display method performed with the display apparatus 1 according to the present embodiment. Referring to FIG. 1 and FIG. 2, a display method according to the present embodiment is now explained in detail.

The projectors 10-1, 10-2, 10-3 are respectively spaced at predetermined intervals at a distance of a from a front surface of the reflection screen 40. The projector 10-2 at the center projects a projection object 50-2 onto the reflection screen 40. Light projected from the projector 10-2 forms, by means of the reflection screen 40, a spatially imaged iris plane 60-2 at a position apart from a surface of the reflection screen 40 by the distance of the viewpoint position d. An iris is a word that refers to the iris of an eye. The spatially imaged iris plane means an image formation plane in which the amount of light is controlled.

In the spatially imaged iris plane 60-2, luminance of the projector 10-2 is the highest at the center of the spatially imaged iris plane 60-2, and gradually decreases as the viewpoint is moved in either of the x direction and the −x direction. Furthermore, the projection object 50-2 is invisible outside both ends of the spatially imaged iris plane 60-2 in the ±x directions.

On a −x direction side of the spatially imaged iris plane 60-2, a spatially imaged iris plane 60-1 is formed by the projector 10-1 (FIG. 2). As is provided by the projection object 60-2, the luminance of a projection object 50-1 has one peak in the spatially imaged iris plane 60-1, and decreases as the viewpoint is moved in either of the ±x directions from a viewpoint corresponding to this peak. Meanwhile, although the spatially imaged iris planes 60-1 and 60-2 are shown for convenience of illustration as if these planes are at different positions in the z direction, these planes have the same viewpoint position d (the interval from the reflection screen 40).

The viewpoint position d in the z-direction where the spatially imaged iris planes 60 are formed meets the following relation: $(1/a)+(1/d)=1/f$, where a focal length of the reflection screen 40 is defined as f, and a distance between the projectors 10 and the reflection screen 40 as a. Each end portions of the x-direction of the spatially imaged iris plane 60-2 at the center overlap part of each of the adjacent spatially imaged iris planes 60-1 and 60-3 (not illustrated).

When the viewpoint goes outside both ends of the spatially imaged iris plane 60-1 in the ±x directions, the projection object 50-1 is not observed. Accordingly, in the case where the intervals between the projection object 50-2, the projection object 50-1, and a projection object 50-3 (not illustrated) are widened so that the spatially imaged iris planes 60 do not overlap each other, the projection object 50-2, the projection object 50-1, and the projection object 50-3 are switched in accordance with the positions of viewpoints, so that the adjacent projection objects 50 are not simultaneously viewed.

In the case where the intervals between the spatially imaged iris plane 60-2, the spatially imaged iris plane 60-1, and the spatially imaged iris plane 60-3 are each narrowed to provide areas where each adjacent pair of the spatially imaged iris planes 60-2, 60-1, and 60-3 overlap each other, the adjacent projection objects 50 can be simultaneously seen in the overlapping areas. That is to say, the viewer α sees the adjacent projection objects 50 as blended (linear blending).

Now, suppose that a video image obtained by capturing an object from the front is projected as the projection object 50-2, a video image obtained by capturing the object from the left direction as the projection object 50-1, and a video image obtained by capturing the object from the right direction as the projection object 50-3 (not illustrated). On this supposition, when moving from the center of the spatially imaged iris plane 60-2 to the spatially imaged iris plane 60-1, the viewer α perceives as if going around the object form the front to the left direction. Alternatively, when moving from the center of the spatially imaged iris plane 60-2 to the spatially imaged iris plane 60-3, the viewer α perceives as if going around the object from the front to the right direction.

In this case, when a parallax interval V between the projection object 50-2 observed in the spatially imaged iris plane 60-2 and the projection object 50-1 observed in the spatially imaged iris plane 60-1 is made smaller than a parallax interval of a fusion limit, the two spatially imaged iris planes 60-2 and 60-1 smoothly fuse with each other with a movement of the viewpoint, so that a video image as seen from an intermediate viewpoint between the projection object 50-2 and the projection object 50-1 can be interpolated. This process also holds for the side of the spatially imaged iris plane 60-3.

The parallax interval V is represented by the following formula.

[Formula 1]
$$V = 2d \times \tan\left(\frac{A}{2}\right) \quad (1)$$

In this formula, the reference sign A denotes a fusion limit angle. The fusion limit angle A is an angle of 6-8 (min). The parallax interval V obtained using the fusion limit angle A is the parallax interval of a fusion limit. The reference sign d denotes the viewpoint position d (the interval between the reflection screen 40 and the spatially imaged iris planes 60).

Meanwhile, a viewpoint interval t on the viewpoint position d is represented by the following formula.

[Formula 2]
$$t = 2d \times \tan\left(\frac{P}{2}\right) \quad (2)$$

In this formula, the reference sign P denotes an interval (deg) between the projectors 10.

The viewer α perceives video images having binocular disparity, thus enabling a naked eye stereoscopic view. A three-dimensional image β is perceived with depth as if it recedes from the front surface of the reflection screen 40 in the z direction.

A perceived depth S is represented by the following formula.

[Formula 3]
$$S = \frac{d \times V}{t - V} \quad (3)$$

Meanwhile, the three-dimensional image β is also capable of being perceived as if it protrudes out of the front surface of the reflection screen 40 in the −z direction. A protrusion amount S' in this case is represented by the following formula.

[Formula 4]
$$S' = \frac{d \times V}{t + V} \quad (4)$$

The diffusion property control unit 30 controls the diffusion property of the reflection screen 40 such that combined luminance provided by combining the projection objects 50-2 and 50-1 projected from the adjacent projectors 10 is constant. The diffusion property of the reflection screen 40 is controlled in accordance with the viewpoint position d detected by the viewpoint position detection unit 20. A specific method for controlling the diffusion property will be described later.

Figure 3:
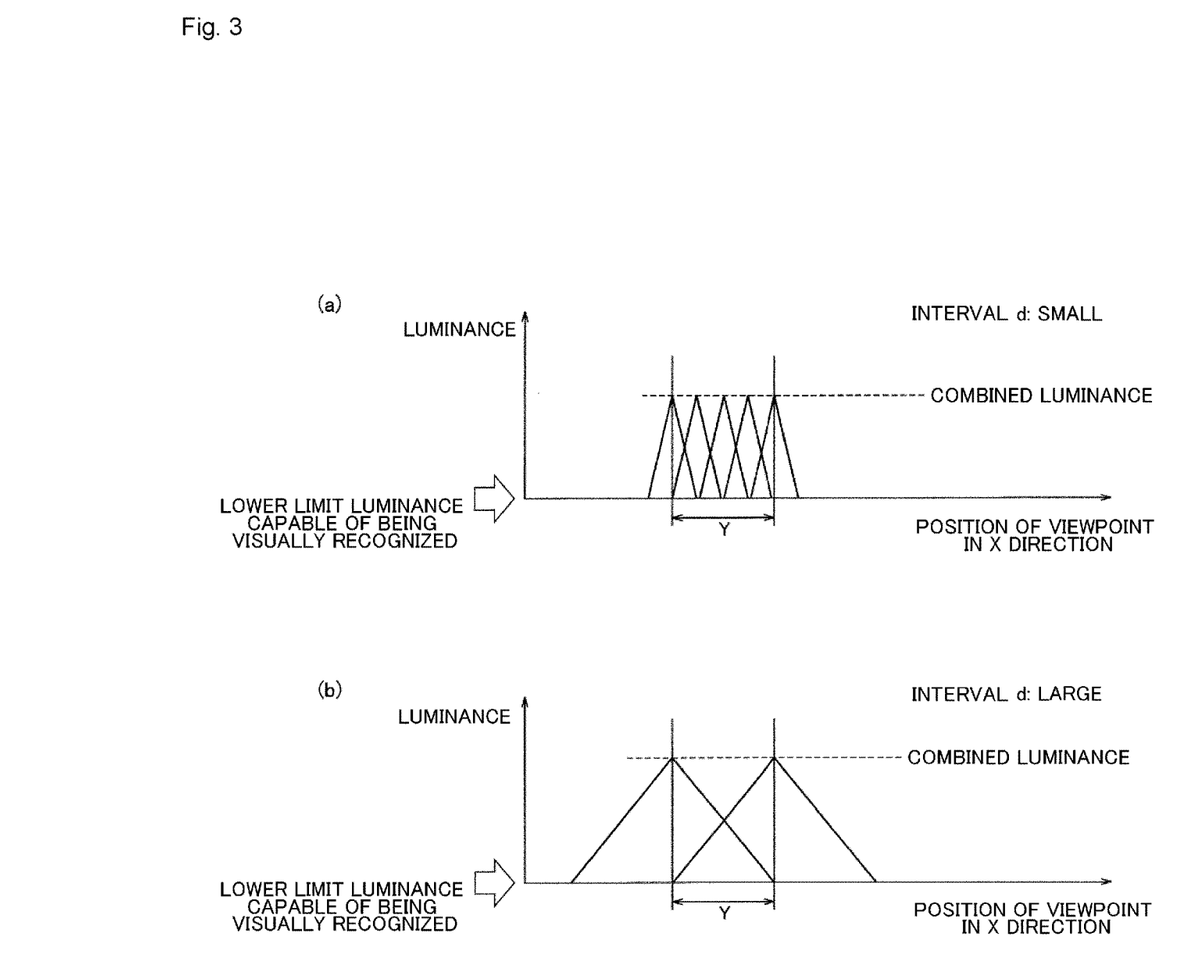
FIG. 3 schematically indicates the relation between an interval between a reflection screen and a viewer, and a diffusion property of the reflection screen.

FIG. 3 schematically indicates the relation between the viewpoint position d and the diffusion property of the reflection screen 40. The horizontal axis in FIG. 3 denotes the position in the x direction on the constant viewpoint position d. The vertical axis in FIG. 3 denotes luminance on the reflection screen 40. FIG. 3(a) indicates the case where the viewpoint position d is small, and FIG. 3(b), the case where the viewpoint position d is large.

FIG. 3(a) indicates an example of the case where five projectors 10 respectively project viewpoint video images having disparity. Each triangle indicated in FIG. 3(a) indicates the distribution of luminance of the viewpoint video image projected from each projector 10.

As indicated in FIG. 3, the combined luminance provided by the projection from the adjacent projectors 10 is constant even when the viewer α moves in the x direction. The range of the constant combined luminance is indicated with the reference sign γ. The three-dimensional image β is perceived by linear blending in the display range indicated with γ.

As indicated in FIG. 3(a), in the case where the viewpoint position d is small, a diffusion angle of the reflection screen 40 is controlled to be narrow, thus requiring many projectors 10. Furthermore, at a viewpoint (in the x direction) where the luminance of one projector 10 is visually recognized to become highest, the luminance of a projector 10 adjacent to the one projector 10 is controlled to a lower limit luminance capable of being visually recognized by the viewer α. This enables the viewer α to perceive a smooth luminance variance.

Meanwhile, as indicated in FIG. 3(b), in the case where the viewpoint position d is large, the diffusion angle of the reflection screen 40 is controlled to be wide. FIG. 3(b) indicates an example in which the diffusion angle is made wide, and the number of projectors 10 is reduced to two. As seen, the number of projectors 10 may be varied in accordance with the viewpoint position d. Reducing the number of projectors 10 would reduce power consumption.

Meanwhile, it is not necessary to reduce the number of projectors 10 even though the diffusion angle is made wide. In the case where the diffusion angle is made wide but the number of projectors 10 is not reduced, the display range γ which can perceive a three-dimensional image can be widened.

Figure 4:
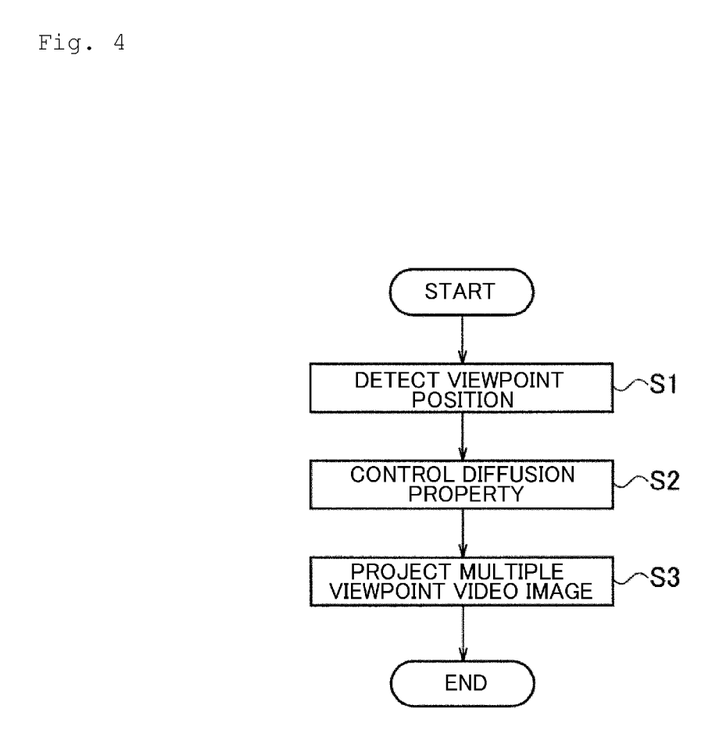
FIG. 4 is a flowchart that indicates an example of the process of the display method performed with the display apparatus illustrated in FIG. 1.

FIG. 4 is a flowchart that indicates an example of the process of the display method performed with the display apparatus 1. Once the display apparatus 1 starts to operate, the viewpoint position detection unit 20 detects the viewpoint position d that denotes the interval between the reflection screen 40 and the viewer α (step S1). The viewpoint position d is detected by using, for example, a camera to capture an image from the x direction or the z direction.

Next, the diffusion property control unit 30 controls the diffusion property of the reflection screen 40 in accordance with the viewpoint position d detected by the viewpoint position detection unit 20 (step S2). The diffusion property of the reflection screen 40 is controlled by, for example, varying the transmittance of a polymer dispersed liquid crystal (PDLC) provided on the front surface of the reflection screen 40.

The transmittance of the PDLC varies according to a voltage value of an ac signal applied to the PDLC. Alternatively, it is varied by varying a duty cycle of the ac signal.

Next, multiple viewpoint video images having disparity are projected from the multiple projectors 10-1, 10-2, and 10-3 to the reflection screen 40 (step S3).

In accordance with the display method according to the present embodiment explained above, the diffusion angle of the reflection screen 40 is controlled to be narrow in the case where the viewpoint position d is small, so that the three-dimensional image β is visually recognized on the spatially imaged iris planes 60 formed on the viewpoint position d. The diffusion angle of the reflection screen 40 is controlled to be wide in the case where the viewpoint position d is large, so that the three-dimensional image β is visually recognized on the spatially imaged iris planes 60 formed on the viewpoint position d. That is to say, the diffusion angle of the reflection screen 40 is appropriately controlled with respect to the disposition interval of the projectors 10 according to the viewpoint position d of the viewer α.

(Reflection Screen)

Figure 5:
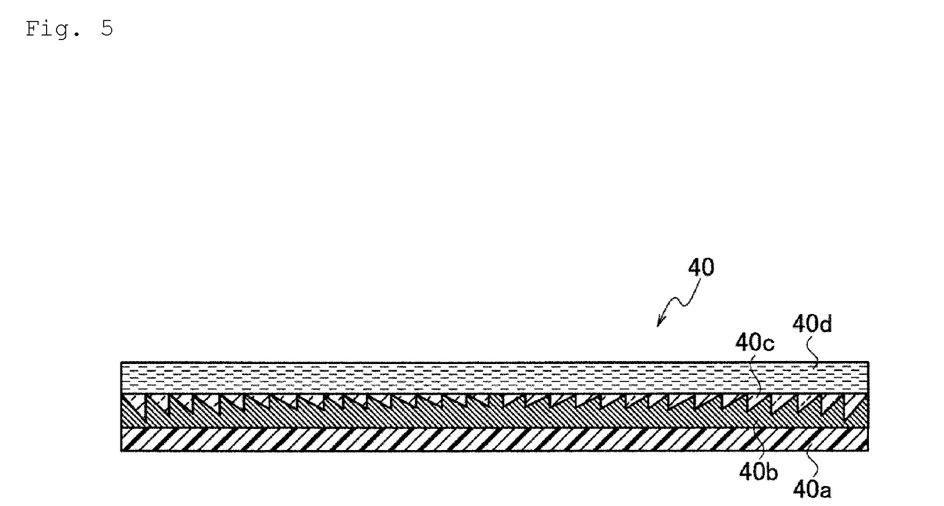
FIG. 5 is a cross-sectional view that schematically indicates the cross-sectional structure of the reflection screen.

FIG. 5 illustrates an example of the cross-sectional structure of the reflection screen 40. The reflection screen 40 has a layered structure comprising a holding plate 40a, a reflective layer 40b, an ultraviolet (UV) polymerized Fresnel lens layer 40c, and a diffuser layer 40d.

The holding plate 40 is a substrate that maintains the flatness of the reflection screen 40, and is formed of, for example, a plastic plate or the like. The reflective layer 40b hs is formed on the front surface side of the holding plate 40a.

The reflective layer 40b is formed of a metal having a high reflectivity, such as aluminum, silver, and nickel, for example. The UV polymerized Fresnel lens layer 10c is formed on the front surface side of the reflective layer 40b.

The UV polymerized Fresnel lens layer 10c has a flat surface on the front surface side, has a Fresnel lens surface on the back surface side, and is formed of a resin such as epoxy acrylate. The anisotropic diffuser layer 40d is formed on the front surface side of the UV polymerized Fresnel lens layer 10c.

The anisotropic diffuser layer 40d can be formed of a PDLC. The diffusion angle can be varied by applying an ac signal to transparent electrodes (not illustrated) formed on the back and front of the anisotropic diffuser layer 40d.

An anisotropic diffuser refers to a diffuser layer that has a characteristic that allows the diffuser layer to diffuse light at different diffusion angles in orthogonal two directions that have a specific relation to the surface shape of the diffuser layer. The distribution of luminance of the anisotropic diffuser layer 40d in the range of the diffusion angle is, for example, Gaussian.

Figure 6:
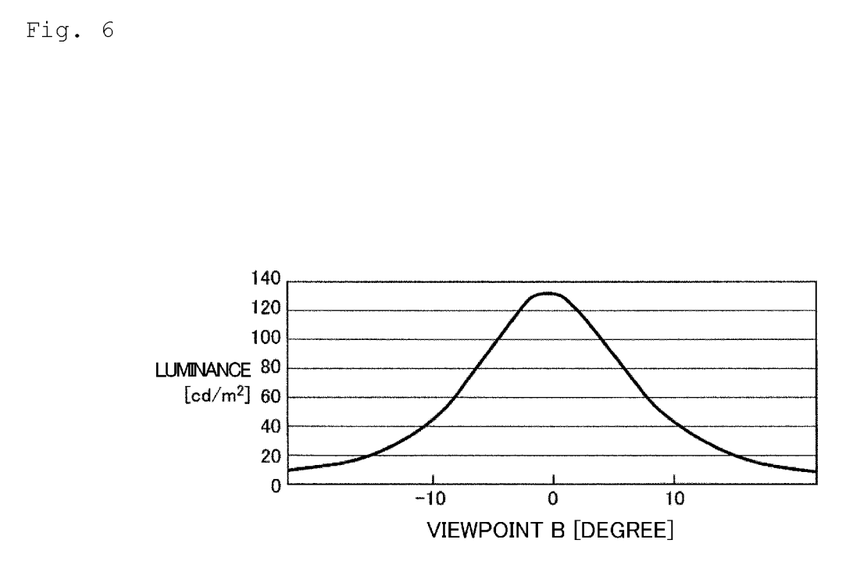
FIG. 6 indicates an example of the distribution of luminance of the reflection screen illustrated in FIG. 5.

FIG. 6 indicates an example of the distribution of luminance of the reflection screen 40. The horizontal axis in FIG. 6 denotes a viewpoint B [degree], and the vertical axis, a luminance [cd/m$^2$].

The viewpoint B [degree] is set to have an angle of 0 degree in the perpendicular direction. A characteristic is indicated in which the luminance moderately decreases with respect to variance of an incidence angle θ around degree 0 in ±direction. In this example, a characteristic is indicated in which the luminance decreases by half when the incidence angle θ varies by about seven degrees.

Use of the reflection screen 40 indicated in FIG. 5 provides the characteristic of the blended, combined luminance indicated in FIG. 3.

As explained, the display apparatus 1 according to the present embodiment is a display apparatus that projects multiple viewpoint video images having disparity from the multiple projectors 10 to display a three-dimensional image. The display apparatus 1 is provided with the viewpoint position detection unit 20 that detects the viewpoint position d where the viewer α visually recognizes the three-dimensional image, the reflection screen 40 of which the diffusion property is controlled, and the diffusion property control unit 30 that controls the diffusion property in accordance with the viewpoint position d. As a result of such a feature, the display apparatus prevents degradation of image quality due to ghosting.

Meanwhile, although the explanation above indicates an example of providing a single viewer α, multiple viewers α may be provided. In the case of multiple viewers α, the viewpoint position d is set to the interval between the reflection screen 40 and one of the viewers α who is closest to the reflection screen 40. As a result, the viewers α can move to visually recognize the three-dimensional image, thus avoiding a failure in display of the three-dimensional image.

Alternatively, viewpoint positions d may be respectively detected for multiple viewers α to control the diffusion property of the reflection screen 40 in accordance with an average value of the detected viewpoint positions d. This minimizes an average of moving distances by which the viewers α move to visually recognize the three-dimensional image.

Note that the explanation above indicates the example in which the viewpoint position detection unit 20 detects the viewpoint position d of the viewer α measured from the reflection screen 40 in the front surface direction, and the diffusion property control unit 30 controls the diffusion property of the reflection screen 40 in accordance with the detected viewpoint position d. The present invention is not limited to the described embodiment.

For example, the viewpoint position d may be fixed at a prescribed position. In the case where the viewpoint position d is fixed, the diffusion property of the reflection screen 40 may be fixed to a diffusion property according to the viewpoint position d as fixed.

Furthermore, although in the indicated example, the projectors 10 and reflection screen 40 faces each other in a thickness direction (z-direction) of the reflection screen 40, this disposition may be rotated 90 degrees. For example, the reflection screen 40 may be disposed on a table having a predetermined height to dispose the projectors 10 at positions that allow the projectors 10 and the reflection screen 40 to face each other in a height direction. Such a configuration provides display of the three-dimensional image at the predetermined height.

Furthermore, although three projectors 10 are used in the embodiment, at least two projectors 10 are only required. A larger number of projectors 10 can provide a larger display range in the x direction.

Furthermore, although the distribution of luminance of the reflection screen 40 in the indicated example is Gaussian, the distribution of luminance may be linear. In brief, this screen can be replaced with any reflection screen that has a distribution of luminance that smoothly transitions with a movement of the viewpoint.

Furthermore, although the viewpoint position d in the explained example is detected with a camera, a means for detection is not limited to this example. For example, the viewpoint position d may be detected with an ultrasonic reflection wave. Alternatively, a switch may be provided on a floor where the viewer α stands so that the viewpoint position d may be detected by on/off of the switch. The viewpoint position detection unit 20 may have any configuration that allows the viewpoint position detection unit 20 to detect the distance between the reflection screen 40 and the viewer α.

As seen, the present invention is not limited to the embodiment, and can be modified within the scope of the spirit of the invention.

INDUSTRIAL APPLICABILITY

The present embodiment achieves easy installation and high luminance, and thus can be applied to, for example, an outdoor signage, a real-time communication display panel, and an entertainment/amusement indication panel, and can be widely used in the field of communication.

REFERENCE SIGNS LIST

1 Display apparatus
10-1, 10-2, 10-3 Projector
20 Viewpoint position detection unit
30 Diffusion property control unit
40 Reflection screen
40a Holding plate
40b Reflective layer
40c UV polymerized Fresnel lens layer
40d Anisotropic diffuser layer
50-1, 50-2, 50-3 Projection objects
60-1, 60-2, 60-3 Spatially imaged iris planes
V Parallax interval
d Viewpoint position
A Fusion limit angle
α Viewer
β Three-dimensional image
γ Display range

The invention claimed is:

1. A display method performed with a display apparatus, comprising:
   detecting a viewpoint position that is a distance between a reflection screen and a viewer;
   controlling a diffusion property of the reflection screen in accordance with the viewpoint position, comprising:
      controlling a diffusion angle of the reflection screen based on the distance between the reflection screen and the viewer, wherein the diffusion angle is made narrower for a shorter distance between the reflection screen and the viewer; and
   projecting multiple viewpoint video images having disparity from multiple projectors to the reflection screen.

2. The display method according to claim 1, wherein controlling the diffusion property of the reflection screen in accordance with the viewpoint position includes controlling the diffusion property by varying a voltage or a duty cycle of an AC signal that is applied to a diffuser layer included in the reflection screen.

3. The display method according to claim 1, wherein controlling the diffusion property of the reflection screen in accordance with the viewpoint position includes further varying a number of projectors in accordance with the viewpoint position.

4. The display method according to claim 1, wherein controlling the diffusion property of the reflection screen in accordance with the viewpoint position includes controlling, at a viewpoint on the viewpoint position where luminance of one of the projectors is visually recognized to become highest, luminance of another of the projectors adjacent to the one of the projectors to a lower limit luminance capable of being visually recognized by the viewer.

5. The display method according to claim 1, wherein the viewpoint position is a distance between the reflection screen and a viewer who is at a position that is closest to the reflection screen.

6. A display apparatus that projects multiple viewpoint video images having disparity from multiple projectors to display a three-dimensional image, the display apparatus comprising:
   a viewpoint detection unit, including a camera, configured to detect a viewpoint position where a viewer visually recognizes the three-dimensional image;
   a reflection screen of which a diffusion property is controlled, wherein a diffusion angle of the reflection screen is controlled based on a distance between the reflection screen and the viewer, wherein the diffusion angle is made narrower for a shorter distance between the reflection screen and the viewer; and
   a diffusion property control unit that controls the diffusion property in accordance with the viewpoint position.

* * * * *